April 18, 1967   J. P. HUFFMAN ETAL   3,315,246
SIGNAL ABSENCE DETECTION CIRCUIT
Filed Jan. 20, 1964   2 Sheets-Sheet 2

INVENTORS
J.P. HUFFMAN AND
J.H. AUER JR.
BY
THEIR ATTORNEY

United States Patent Office 3,315,246
Patented Apr. 18, 1967

3,315,246
SIGNAL ABSENCE DETECTION CIRCUIT
Jerry P. Huffman, Rochester, and John H. Auer, Jr., Fairport, N.Y., assignors to The General Signal Corporation, Rochester, N.Y., a corporation of New York
Filed Jan. 20, 1964, Ser. No. 338,848
2 Claims. (Cl. 340—248)

This invention relates to signal absence detection circuits, and more particularly to a circuit for determining absence of a line signal for a predetermined minimum duration of time.

In electrical systems of all sorts, it is often highly desirable that absence of a signal due to circuit failure be detected. This is especially important in computing systems, wherein absence of a signal must be detected in order that computations performed by the system do not produce a result based upon absence of signal caused by circuit failure. The novel circuit herein disclosed provides means for detecting loss of a signal due to circuit failure, along with means for automatically extinguishing the failure indication provided therefrom after the circuit failure has been corrected.

Accordingly, one object of the invention is to provide a signal absence detection circuit which automatically resets itself upon correction of a detected circuit failure.

Another object is to provide a compact, rugged signal check circuit for indicating absence of line pulses only during the period in which such line pulses are absent, independent of the line pulse repetition rate.

Another object is to provide a signal absence detection circuit which produces an indication of circuit failure only after a predetermined interval subsequent to loss of the sensed signal has elapsed.

The invention contemplates energy storage means, means continuously coupling input energy to the storage means, means responsive to incoming pulses for discharging the storage means upon occurrence of a pulse, and switching means responsive to the level of voltage on the storage means for providing an output signal when the level exceeds a predetermined value.

The foregoing and other objects and advantages of the invention will become apparent from the following detailed description when read in conjunction with the accompanying drawings, in which.

Figure 1:
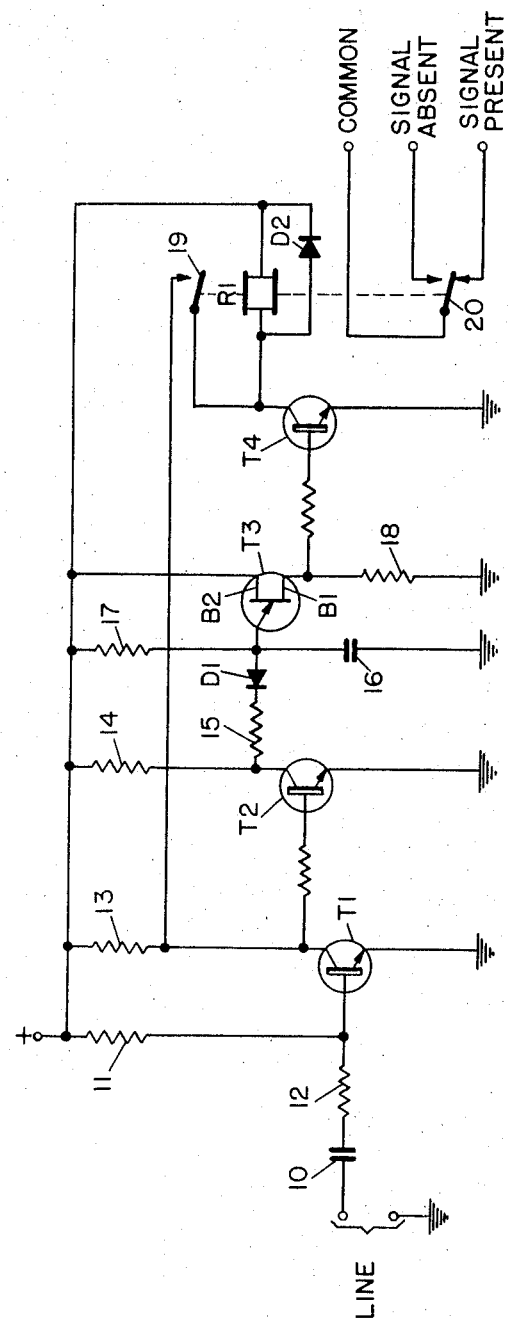
FIG. 1 is a schematic diagram of one embodiment of the signal absence detection circuit.

In the circuit of FIG. 1, either positive or negative line pulses are received by an RC differentiating network comprising a capacitor 10 and a pair of series-connected resistors 11 and 12. Resistor 12, coupled between capacitor 10 and resistor 11, functions as a base resistor for a transistor T1, since the junction common to resistors 11 and 12 is coupled to the base of transistor T1, the emitter of which is grounded. Output voltage supplied by the differentiating network appears across resistor 11, and output pulses produced at the collector of transistor T1 in response to received line pulses are resistively coupled to the base of a transistor T2. Collector bias is supplied to transistor T1 through a collector load resistor 13.

Transistor T2 receives collector bias through a collector load resistor 14, while the emitter of transistor T2 is grounded. In addition, a resistor 15 is connected in series with a diode D1 between the collector of transistor T2 and the emitter of a unijunction transistor T3, the anode of diode D1 being directly coupled to the emitter of the unijunction transistor. A capacitor 16 is coupled from the anode of diode D1 to ground, while positive bias voltage is supplied to the capacitor through a resistor 17. Capacitor 16 therefore continuously receives energy through resistor 17, and hence charges at a rate determined substantially by the RC time constant of resistor 17 and capacitor 16.

Base B1 of transistor T3 is coupled to ground through a load resistor 18, while base B2 of transistor T3 is coupled to the positive voltage source. Firing of the unijunction transistor is controlled by voltage stored across capacitor 16. Because a unijunction transistor inherently exhibits a stable firing voltage, there exists a particular value of voltage which, when stored on capacitor 16, causes the unijunction transistor to fire.

Output voltage of transistor T3, which appears across load resistor 18, is resistively coupled to the base of a transistor T4. The collector of transistor T4 receives positive voltage through the coil of a relay R1, while the emitter is grounded. In addition, a front contact 19 of relay R1 couples energy from the collector of transistor T1 to the relay coil. A diode D2 is shunted across the relay coil in order to protect the collector circuit of transistor T4 from high voltages inductively produced when relay R1 is deenergized. A front and back contact 20 is also associated with relay R1 for the purpose of producing an output signal indicative of absence or presence of line pulses. Energy for this output signal may be supplied to the heel of contact 20.

In operation, assume first that repetitive positive line pulses are continually being detected. Transistor T1 is normally biased to conduction, because of the positive base bias supplied through resistor 11. Between line pulses, the line side of capacitor 10 is at substantially a zero voltage level. When the start of a positive line pulse is received at the capacitor, both sides of capacitor 10 rise to the voltage amplitude of the pulse. The circuit side then rapidly discharges toward zero voltage level through resistor 12 and transistor T1, at a rate approximately dependent upon the RC time constant of resistor 12 and capacitor 10, while the line side of the capacitor remains at the amplitude of the pulse. Upon completion of the line pulse, the line side of capacitor 10 again falls to substantially zero voltage, and the circuit side momentarily falls below zero voltage by an amount equal to the amplitude of the pulse. Transistor T1 is thus momentarily rendered nonconductive. Capacitor 10 then begins to acquire a charge through resistors 11 and 12, and eventually the voltage on the circuit side of the capacitor reaches an amplitude which again triggers transistor T1 into conduction. The time during which transistor T1 is non-conductive is determined approximately by the RC time constant of resistors 11 and 12 in series, and capacitor 10. Thus, upon initial receipt of the positive line pulse, since the line side of capacitor 10 swings positive, the circuit side momentarily becomes more positive by an amount equal to the increased positive voltage on the line side; however, during the interval in which the line pulse is present, the excess positive charge on the circuit side of the capacitor leaks off through resistor 12 and transistor T1 in series, so that prior to completion of the line pulse, the circuit side of capacitor 10 is restored to substantially zero voltage level. Upon completion of the line pulse, the circuit side of capacitor 10 is driven below zero voltage level by an amount equal to the voltage amplitude of the pulse. In this fashion, initiation of each positive line pulse provides a positive pulse at the base of transistor T1, which has no effect on the transistor because of the presence of positive base bias thereon. Upon completion of each positive line pulse, however, a negative pulse is produced on the base of transistor T1, momentarily driving the transistor out of conduction. Resistor 12 provides limitation of base current to transistor T1 upon initiation of each received line pulse.

Each time transistor T1 becomes non-conductive, an abrupt, though momentary, increase in collector voltage appears on the transistor. This collector voltage pulse is applied to the base of transistor T2, thereby momentarily driving transistor T2 into conduction. At this instant, the charge stored on capacitor 16 is discharged through a series circuit comprising diode D1, resistor 15 and transistor T2. Resistor 15 limits the amplitude of capacitor discharge current flow through transistor T2, while diode D1 prevents charging of capacitor 16 through resistors 14 and 15.

After capacitor 16 has discharged through transistor T2, the potential across the capacitor is lowered to substantially zero. When transistor T2 again becomes non-conductive, due to decreased collector voltage on transistor T1, capacitor 16 again starts to charge. Thus, if line pulses are detected at sufficiently frequent intervals, capacitor 16 is discharged at the end of each interval through transistor T2 before the voltage stored on the capacitor increases to an amplitude sufficient to fire unijunction transistor T3. Under these conditions, transistor T4 remains non-conductive since its base is held at substantially ground potential. Relay R1 is thereby deenergized, and energy supplied to the heel of contact 20 appears on the back contact, providing an indication that line pulses are present.

Assume now that line pulses have been interrupted. If this interruption lasts beyond a predetermined length of time dependent upon the RC time constant of resistor 17 and capacitor 16, the voltage stored on capacitor 16 increases to an amplitude sufficient to fire unijunction transistor T3, since transistor T2 remains non-conductive due to absence of line pulses. Hence, unijunction transistor T3 fires, causing current flow from the emitter through base B1 and resistor 18 to ground, producing a voltage across resistor 18 which drives transistor T4 into conduction. Relay R1 is thereby energized, closing front contacts 19 and 20. Front contact 19 provides a stick circuit for the relay since capacitor 16 is discharged by unijunction transistor T3 therefore this voltage across resistor 18, which maintains transistor T4 in a fully conductive condition, appears only intermittently. Since transistor T1 is steadily conductive under these conditions, relay R1 is held energized through a series circuit comprising front contact 19 and transistor T1. Front contact 20 provides alarm energy indicative of missing line pulses.

When line pulses are again received, transistor T1 is again periodically pulsed into non-conduction, thereby periodically driving transistor T2 into conduction. Moreover, when transistor T1 is first driven out of conduction upon resumption of line pulses, relay R1 is deenergized, since stick circuit current flow through transistor T1 is momentarily interrupted. In addition, capacitor 16 is again periodically discharged, resulting in unijunction transistor T3 being held non-conductive. Hence, transistor T4 is no longer conductive, and relay R1 remains deenergized. An indication that line pulses are present is once again produced at back contact 20.

Figure 2:
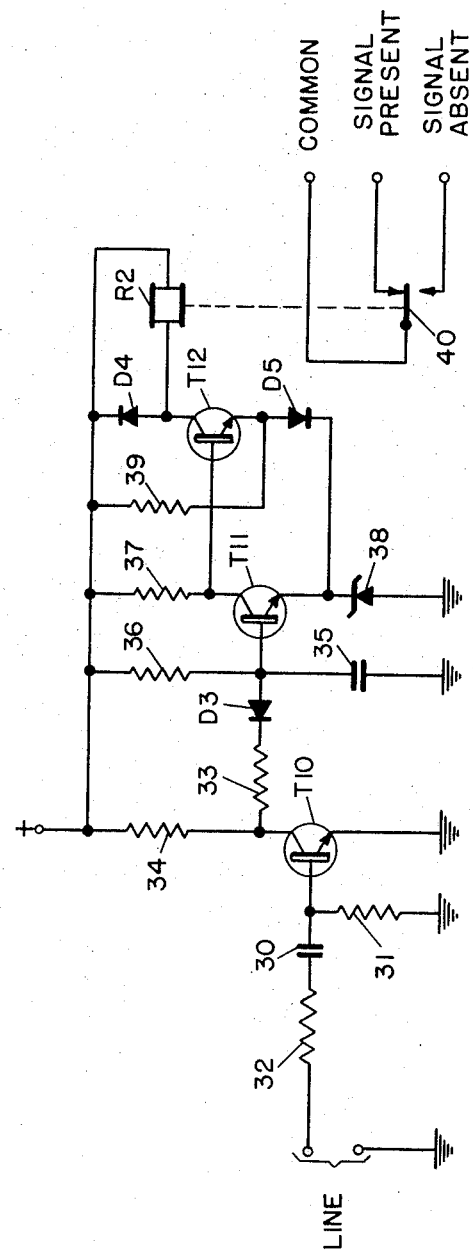
FIG. 2 is a schematic diagram of a second embodiment of the signal absence detection circuit.

Turning now to the circuit of FIG. 2, there is shown a second embodiment of the signal absence detection circuit, which comprises but three active semiconductor elements in combination with a zener diode. In addition, no stick circuit is required for operation of the output relay R2. In this embodiment, either positive or negative line pulses are received across an RC differentiating network comprising a capacitor 30 and a resistor 31. Differentiated line pulses appearing across resistor 31 are coupled to the base of a transistor T10, the emitter of which is grounded. A resistor 32 is coupled in the line circuit in series with capacitor 30 for limiting base current amplitude through transistor T10. Output pulses produced at the collector of transistor T10 in response to received line pulses are coupled to the base of a transistor T11 through a series-connected resistor 33 and diode D3, the anode of which is coupled to the base of transistor T11. Collector bias is supplied to transistor T10 through a collector load resistor 34. A capacitor 35 is coupled from the base of transistor T11 to ground, while positive bias voltage is supplied to the capacitor through a resistor 36. Capacitor 35 therefore continuously receives energy through resistor 36 and hence charges at a rate determined substantially by the RC time constant of resistor 36 and capacitor 35.

Collector bias is furnished to transistor T11 through a collector load resistor 37, while the emitter of transistor T11 is coupled to the cathode of a zener diode 38, the anode of which is grounded. The zener diode biases the emitter of transistor T11 above ground, thereby requiring that voltage stored on capacitor 35 achieve a value in excess of the voltage drop across the zener diode in order to drive transistor T11 into conduction. Under these conditions, transistor T11 base potential exceeds emitter potential. The zener diode stabilizes emitter potential on transistor T11, making this potential substantially independent of emitter current.

Output voltage produced at the collector of transistor T11 is applied to the base of a transistor T12. Positive bias is supplied to the emitter of transistor T12 through a resistor 39. The anode of a diode D5 is coupled to the emitter of transistor T12, while the cathode of diode D5 is coupled to the cathode of zener diode 38. Using the zener diode cathode potential as a reference level, the emitter of transistor T12 is biased above the reference level by an amount equal to the forward voltage drop across diode D5. Resistor 39 permits current flow through diode D5, thereby maintaining anode potential on the diode above collector potential on transistor T11 when the transistor is in conduction; however, when transistor T11 is not in conduction, collector potential on the transistor T11 exceeds anode potential on diode D5. Because the biasing network comprising resistor 39 and diode D5 maintains substantially constant emitter potential on transistor T12, base potential on the transistor swings above or below the emitter potential, depending upon whether or not transistor T11 is in conduction. Hence, output voltage from transistor T11 controls conduction of transistor T12.

Collector bias is supplied to transistor T12 through the coil of output relay R2. In addition, a diode D4 is shunted across the relay coil in order to protect the collector of transistor T12 against high amplitude transient voltages induced by the relay coil whenever the relay is deenergized. It will be noted that when front contact 40 of the relay is closed, presence of line pulses is indicated, while when back contact 40 of the relay is closed, absence of line pulses is indicated.

In operation, assume first that repetitive positive line pulses are continually being detected. Transistor T10 is normally biased to cutoff, since the base is coupled to ground through resistor 31. Thus, between line pulses, transistor T10 is normally non-conductive. Each time a positive line pulse is received, the pulse is differentiated, so that at the outset of the pulse, the base of transistor T10 is driven positive. The transistor thus becomes conductive for a duration dependent upon the width of the positive differentiated pulse thereby produced. Resistor 32 limits base current through transistor T10 at this time.

Upon completion of the line pulse, a negative pulse is produced across resistor 31 due to the differentiation of resistor 31 and capacitor 30. This negative voltage merely serves to drive transistor T10 further into cutoff, and therefore has no effect on the circuit.

Each time transistor T10 momentarily becomes conductive, capacitor 35 is discharged through a series circuit comprising diode D3, resistor 33 and transistor T10. When transistor T10 again becomes non-conductive, capacitor 35 starts to charge through resistor 36. As long as capacitor 35 is periodically discharged by transistor T10 in response to received line pulses, the voltage stored on the capacitor is kept below a predetermined level corresponding to the voltage drop across zener diode 38. As long as the capacitor voltage remains below this level, the base of transistor T11 is biased below the emitter, maintaining the transistor in a non-conductive condition. Thus, very little voltage drop appears across resistor 37, and transistor T12 is maintained in conduction since the base of transistor T12 remains biased at a potential above that at the emitter. Hence, relay R2 is held energized through the series circuit comprising transistor T12, diode D5 and zener diode 38.

Assume now that the receipt of line pulses by the circuit of FIG. 2 is interrupted. Transistor T10 is thus maintained steadily non-conductive, so that no discharge path appears for capacitor 35. Under these conditions, the voltage stored on capacitor 35 increases to a valve above the voltage drop across zener diode 38, thereby rendering transistor T11 conductive. Collector voltage on transistor T11 then falls to a value below the emitter voltage of transistor T12. This renders transistor T12 non-conductive, deenergizing relay R2. Back contact 40 thus closes, indicating absence of line pulses.

When line pulses are again received, transistor T10 is again periodically pulsed into conduction, thereby periodically discharging capacitor 35 and maintaining transistor T11 at cut off. Thus, transistor T12 again becomes conductive, and relay R2 is energized, thereby closing front contact 40 to indicate receipt of line pulses. It is now obvious that if line pulses are detected at sufficiently frequent intervals, capacitor 35 is discharged through transistor T10 at the end of each interval, before the voltage stored on the capacitor increases to a value which drives transistor T11 into conduction. The time interval during which line pulses must be absent, before loss of received signal is indicated, is controlled substantially by the RC time constant introduced by resistor 36 and capacitor 35, and may be varied by adjusting the values of either or both of these components.

Although the invention has been described as operating in response to received positive line pulses, it is clear that absence of negative line pulses may also be detected. This is true since the input to the embodiments of both FIGS. 1 and 2 comprises a differentiation network, which operates in response to both the rising and falling sides of received line pulses, and whether a rising side precedes a falling side, or vice versa, is immaterial. For example, in FIG. 1, in order to maintain relay R1 deenergized, transistor T1 must be repetitively driven out of conduction either by the trailing edge of a positive line pulse or the leading edge of a negative line pulse; similarly, in FIG. 2, in order to maintain relay R2 energized, transistor T10 must be repetitively driven into conduction either by the leading edge of a positive line pulse or the trailing edge of a negative line pulse.

Thus, there has been shown two embodiments of a signal absence detection circuit for sensing absence of line pulses. The period of non-detection required to produce a signal absence indication is readily adjustable by controlling the value of an RC time constant. Moreover, either an energized or deenergized relay may be used to provide the absence indication. The circuit is compact, rugged, and adds but slight attenuation to the monitored line.

Although but two embodiments of the present invention have been described, it is to be specifically understood that these forms are selected to facilitate in disclosure of the invention rather than to limit the number of forms which it may assume; various other modifications and adaptations may be applied to the specific forms shown to meet requirements of practice, without in any manner departing from the spirit or scope of the invention.

What is claimed is:

1. A signal absence detection circuit comprising impedance means, capacitance means coupled to the impedance means, means continuously coupling energy to the junction of the impedance and capacitance means, means responsive to incoming pulses for completing a discharge path across the capacitance means upon occurrence of each pulse, and switching means responsive to the amplitude of voltage across the capacitance means for providing an output signal when the amplitude exceeds a predetermined value, said switching means comprising a zener diode, first and second transistors each having a base, an emitter and a collector, means coupling the zener diode to the emitter of the first transistor for providing constant bias thereto, means coupling the base of the first transistor to the junction of the impedance and capacitance means, means coupling the collector of the first transistor to the base of the second transistor, means coupling the emitter of the first transistor to the emitter of the second transistor for biasing the emitter of the second transistor at a voltage in excess of the bias on the emitter of the first transistor, and relay means controlling energization of an alarm circuit, said relay means being coupled to the collector of the second transistor and responsive to voltage appearing thereon.

2. The signal absence detection circuit of claim 1 wherein the means coupling the emitter of the first transistor to the emitter of the second transistor comprises unidirectional conducting means having an anode and a cathode, said anode being coupled to the emitter of the second transistor and said cathode being coupled to the emitter of the first transistor, and means forward-biasing the unidirectional conducting means.

References Cited by the Examiner

UNITED STATES PATENTS

| | | | |
|---|---|---|---|
| 2,824,175 | 2/1958 | Meacham et al. | 307—88.5 |
| 2,892,101 | 6/1959 | Bright | 317—148.55 |
| 2,904,742 | 9/1959 | Chase | 307—88.5 |
| 2,970,228 | 1/1961 | White et al. | 317—148.55 |
| 3,065,388 | 11/1962 | Pinckaers | 317—148.5 |
| 3,192,449 | 6/1965 | Brockett | 317—148.5 X |
| 3,200,306 | 8/1965 | Atkins et al. | 317—146 |
| 3,202,976 | 8/1965 | Rowell | 328—120 X |

NEIL C. READ, *Primary Examiner.*

D. K. MYER, *Assistant Examiner.*